United States Patent [19]

Oogai et al.

[11] Patent Number: 4,537,910

[45] Date of Patent: Aug. 27, 1985

[54] METHOD OF PRODUCING CATION-EXCHANGE MEMBRANE HAVING ROUGHED SURFACE

[75] Inventors: Michiharu Oogai, Hikari; Toru Seita, Shinnanyo; Kosuke Takeshige, Kudamatsu; Hideo Shuyama, Hofu, all of Japan

[73] Assignee: Toyo Soda Manufacturing Co., Ltd., Shinnanyo, Japan

[21] Appl. No.: 550,338

[22] Filed: Nov. 9, 1983

[30] Foreign Application Priority Data

Nov. 10, 1982 [JP] Japan .................................. 57-196104
Nov. 11, 1982 [JP] Japan .................................. 57-196836
Nov. 12, 1982 [JP] Japan .................................. 57-197690

[51] Int. Cl.$^3$ .............................................. C08D 5/20
[52] U.S. Cl. .................................................... 521/27
[58] Field of Search ............................ 521/27; 528/490; 156/668; 264/219, 233, 293, 344

[56] References Cited

U.S. PATENT DOCUMENTS 3,859,110  1/1975  Foster et al. ........................ 264/293
4,381,985  5/1983  Ryder, Jr. ............................ 204/296
4,426,271  1/1984  Yoshida et al. ..................... 204/296

FOREIGN PATENT DOCUMENTS 55-110786   8/1980  Japan .
56-108888   8/1981  Japan .
56-116891   9/1981  Japan .
57-70285    4/1982  Japan .
851021     10/1960  United Kingdom .

Primary Examiner—Joseph L. Schofer
Assistant Examiner—Peter F. Kulkosky
Attorney, Agent, or Firm—Armstrong, Nikaido, Marmelstein & Kubovcik

[57] ABSTRACT

A method of producing a cation-exchange membrane having roughed surface which is characterized in mixing silica powder with water to give a suspended or pasty mixture, supporting the resultant mixture on art paper or filter paper, drying the mixture to form silica powder layer, adhering with heating and pressing the silica powder layer on surface of membrane composed of perfluorocarbon polymer, and removing the silica powder layer formed on the surface of said membrane with caustic alkali aqueous solution.

13 Claims, No Drawings

METHOD OF PRODUCING CATION-EXCHANGE MEMBRANE HAVING ROUGHED SURFACE

DETAILED DESCRIPTION OF INVENTION

This invention relates to a method of producing a cation-exchange membrane of roughed surface.

In the method (ion-exchange membrane method) of electrolyzing alkali chloride aqueous solution in an elecyrolysis cell which is partitioned into anode chamber and cathode chamber by a cation-exchange membrane to produce alkali hydroxide, energy-saving has been remarkably attempted in recent years and, in particular, a method of deminishing electric power for electrolysis by extremely lowering the electric voltage for electrolysis has been drawing attention.

As the method therefor, various means of considering properties of materials, compositions and shape on anode or cathode, specifying composition of employed cation-exchange membrane or kind of ion-exchange group and so on were hitherto proposed, but any of these means could not necessarily be full-satisfactory from the industrial aspect, though every of them could display some merits.

On the other hand, a method of lessening extremely a portion of electrolysis voltage based on resistance of electrolytic solution or air-bubble existing between anode and cathode by approaching anode to cathode as near as possible is becoming a leading one in recent years. As an ideal mode thereof, a method called "SPE electrolysis method" to minimize resistance between anode and cathode by uniting them with cation-exchange membrane in a body is proposed, but this method has yet many problems to be solved at present and therefore it is difficult to industrialize it.

On the other hand, in order to approach electrodes to membrane as near as possible or contact them closely without uniting the membrane and the electrodes in a body, treatments of membrane surface are proposed. There are, for example, a method of roughing membrane surface (Japanese Kokai No. Sho 55-110786, Kokai No. Sho 56-116891, Kokai No. Sho 57-70285), a method of forming a porous layer composed of metal oxides (Japanese Kokai No. Sho 56-108888) and so on. In any surface-treated membrane by the above methods, a drastic elevation of voltage due to air-bubble usually occured in electrolysis can be prevented, when the electrodes are apporached to the membrane. However, upon reviewing thereof by the inventors of this invention, the roughing-treated membrane through the blasting method suffers very often from injuries on said membrane by a reason that the roughing is formed through collisions of particles with the membrane at high speed when blasted, which causes the drop of electric current efficiency and hence it is not a completed method. Also, in case particles of aluminum, zinc, tin, nickel or the like are pressed thereon with heating and thereafter such particles are removed to give the roughing thereto, the value of decrease in electric voltage becomes little with maintaining high electric current efficiency, and then it can not be yet a satisfactory method. Then, the embossing employed generally as the surface-fabricating method of plastic films can not form desired roughing, which induces many difficulties in preventing completely the electric voltage from elevating, which occurs at approaching of electrodes to the membrane.

It is difficult to simply apply the roughing of making the surface of membrane hydrophilic to the cation-exchange membrane, which was already known as seen in, for example, B.P. No. 851.021 like this.

On the other hand, in case a porous layer consisting of a metal oxide is formed on the surface, there always remains a problem on the flaking of the attached porous layer with lapse of time.

The inventors of this invention continued studies on the method for producing the membrane, which has not these disadvantages and further can lower extremely the electrolysis voltage, and upon scrutinizing lots of roughed surfaces through the electronic microscope to find out the reason causing the drop of current efficiency, the inventors have arrived at the following conclusion.

In case the particle layer is formed with zinc, tin or the like, a binder is used for easiness in handling at the time of drying, and hence the particle layer sometimes hardens or becomes firm on account of the high bulk density of this particle layer. Therefore, when this particle layer is subjected to pressing with heating, the pressure is not satisfactorily transmitted to the surface of membrane to generate the sideway force against the surface of membrane or add a strong force on a part thereof, and thereby marks like a crack or deep holes are formed on the surface of membrane, which causes the drop of current efficiency. Then, said conclusion is that, in order to form a satisfactory roughed surface, it is important to form the particle layer consisting of particles having low bulk density so as to make the particle layer have an action of making the pressure even throughout the layer at the time of adding the pressure thereto. The inventors further continued the studies, based on this conclusion, to find out a method capable of scaling up economically that does not cause the elevation of voltage even with approaching the electrodes to the membrane and moreover can maintain the high current efficiency by pressing a particle layer, of which particles are selected from the specialized powders or particles, on the surface of cation-exchange membrane with heating, followed by removing this particle layer therefrom. Then, by this method, the surface-treatment of cation-exchange membrane becomes feasible with good reproductivity, which leads to the completion of a method for producing cation-exchange membrane having roughed surface. That is, the first invention of the present inventions relates to a method of producing a cation-exchange membrane having roughed surface which is characterized in mixing silica powder with water to give a suspended or pasty mixture, supporting the resultant mixture on art paper or filter paper, drying the mixture to form silica powder layer, heating and pressing the silica powder layer on surface of membrane composed of perfluorocarbon polymer, and removing the silica powder layer formed on the surface of said membrane with causitc alkali, providing the cation-exchange membrane having roughed surface of not only preventing a marked elevation of voltage at the time of approaching the electrodes to the membrane but also lowering electrolysis voltage and further producing caustic alkali of high quality in case of electrolysis of alkali chloride aqueous solution with the use of the cation-exchange membrane.

As the cation-exchange membrane employed in this invention, perfluorocarbon polymer is used, which is excellent in heat-resistance, chemical-resistance, mechanical strength and the like. The perfluorocarbon polymer has cation-exchange groups and/or groups capable of converting to the cation-exchange groups, of which groups can be exemplified as sulfonic acid group (—$SO_3M$ wherein M denotes hydrogen atom or metal atom), —$SO_2F$ and —$SO_2Cl$ which is respectively a precursor of the sulfonic acid group, carboxylic acid group (—COO M wherein M denotes hydrogen atom or metal atom), —COF, —COOR and CN which is respectively a precursor of the carboxylic acid group (R denotes alkyl group of carbon number 1-5). As said polymer, can be exemplified a polymer of the following general formula.

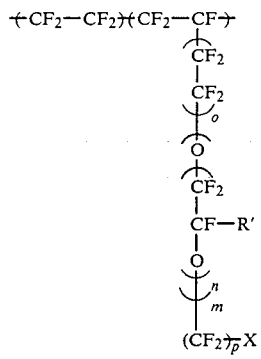

Wherein
R'=—$CF_3$, —$CF_2$—O—$CF_3$
n=0 or 1-5
m=0 or 1
o=0 or 1
p=1-6
X=—$SO_3M$ (M denotes hydrogen atom or metal atom)
—$SO_2F$, —$SO_2Cl$
—COO M (M denotes hydrogen atom or metal atom)
—COO $R_1$ ( R=alkyl of carbon number 1-5)
—CN, —COF also, polymers obtained by polymerizing the components of the above binary polymer with the third component or the fourth component can be used. Concretely speaking, for example, the following polymers can be exemplified.

(A group)

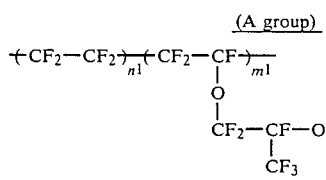 (1)

$n^1/m^1$ = 4.5 to 13.5 preferably 6.5 to 10.5.

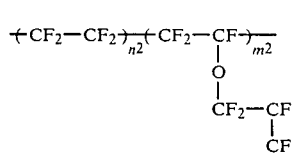 (2)

$n^2/m^2$ = 3 to 12 preferably 5 to 9.

-continued

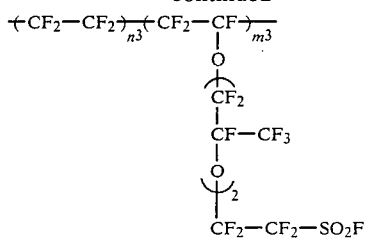 (3)

$n^3m^3$ = 3 to 12 preferably 5 to 9.

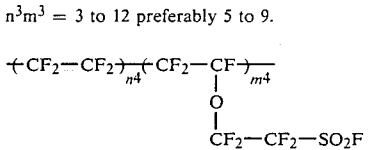 (4)

$n^4/m^4$ = 6.2 to 15.2 preferably 8.2 to 12.2.

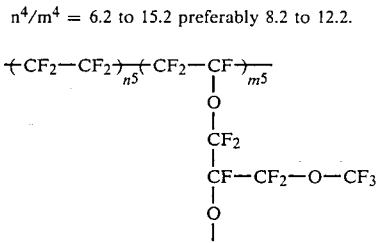 (5)

$n^5/m^5$ = 3.9 to 12.9 preferably 5.9 to 9.9.

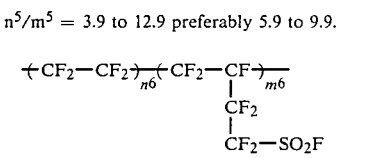 (6)

$n^6/m^6$ = 6.4 to 15.4 preferably 8.4 to 12.4.

(B group)

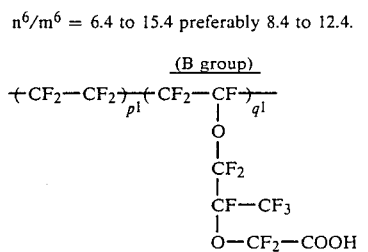 (1)

$p^1/q^1$ = 15.8 to 0.9 preferably 7 to 1.5.

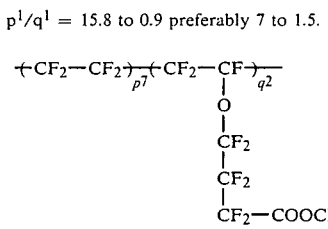 (2)

$p^2/q^2$ = 16.4 to 1.4 preferably 7.6 to 2.0

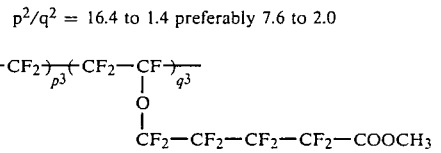 (3)

$p^3/q^3$ = 16.4 to 1.8 preferably 7.6 to 2.0

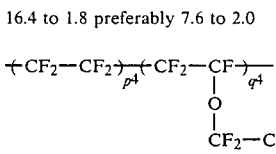 (4)

$p^4/q^4$ = 17.6 to 2.6 preferably 8.7 to 3.1

-continued

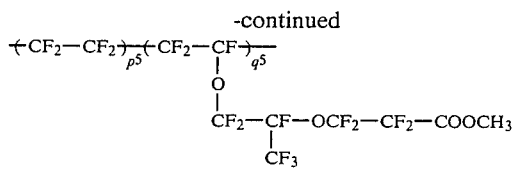

$p^5/q^5$ = 15.8 to 0.9 preferably 7 to 1.5.

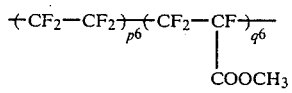

$p^6/q^6$ = 18.6 to 3.6 preferably 9.7 to 4.2.

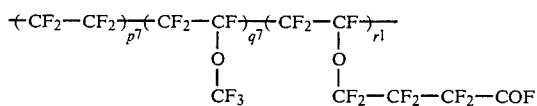

$(p^7 + q^7)/r^1$ = 17.1 to 1.2 preferably 8.2 to 1.6.

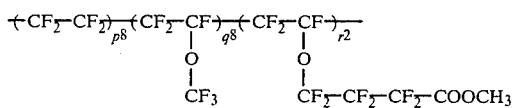

$(p^8 + q^8)/r^2$ = 17.1 to 1.2 preferably 8.2 to 1.6.

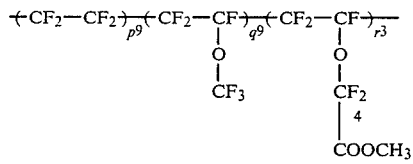

$(p^9 + q^9)/r^3$ = 16.4 to 0.9 preferably 7.6 to 1.2.

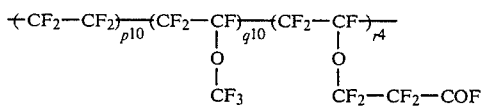

$(p^{10} + q^{10})/r^4$ = 17.6 to 1.6 preferably 8.7 to 1.9.

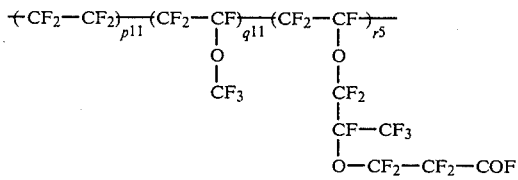

$(p^{11} + q^{11})/r^5$ = 15.8 to 0.5 preferably 7 to 0.9.

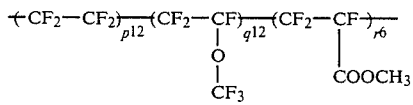

$(p^{12} + q^{12})/r^6$ = 18.6 to 2.1 preferably 9.7 to 2.5.

In these polymers, it is preferable to control ion-exchange capacity to be in a range from 0.5 meq/g of dry resin to 1.5 meq/g of dry resin.

In this invention, these polymers formed into a membrane shape can be used not only in a single body but also in another form where sulfonic acid group or group convertible into the sulfonic acid group and carboxylic acid group or group convertible into the carboxylic acid group are present together, preferably in a form where a polymer having sulfonic acid group or group convertible into the sulfonic acid group and a polymer having carboxylic acid group or group convertible into the carboxylic acid group are layered each other on one side thereof respectively. This membrane shaped matter can be obtained by forming the polymer having sulfonic acid group or group convertible into the sulfonic acid group (for example, a polymer of (A) group) and the polymer having carboxylic acid or group convertible into carboxylic acid group (for example, a polymer of (B) group) into a membrane shape respectively, followed by combining them, or can be also obtained by giving a chemical treatment on only one side of the membrane shaped matter composed of a polymer having sulfonic acid group or group convertible into sulfonic acid group and thereby converting these groups into carboxylic acid group or group convertible into the carboxylic acid group. It can be further obtained by giving a chemical treatment on only one side of the membrane shaped matter composed of a polymer having carboxylic acid group or group convertible into the carboxylic acid group and thereby converting these groups into sulfonic acid group or group convertible into the sulfonic acid group, too. Then, the thickness of the employed membrane is generally in a range of 50μ–500μ, of which suitable thickness is selected on consideration of specific conductivity of the membrane and current efficiency thereof. At the time of roughing the surface of cation-exchange membrane, it is most important to select the kind of powder particle and paper which is a carrier of the powder. As the powder particle, silica of the average particle diameter being 0.01–20μ, preferably 0.1–10μ is employed. Said silica powder is once formed as a particle layer on the carrier. If the silica powder is formed directly on the cation-exchange membrane by means of coating or the like, preferably roughing can not be obtained by reason of occurrence of wrinkles on the cation-exchange membrane or cracks of the particle layer.

As the carrier, the filter paper or art paper (trade name) are used. Papers other than these are not preferable by reason that a uniform silica layer can not easily obtained, the particle drop off in handling the particle layer in dry state, or the particle layer suffers from cracks.

Also, in case powders other than silica, for example, aluminum, nickel, tin or the like is used, it is not suitable as a material to be roughed by reason that the particle drop off in handling the particle layer in dry state or the particle layer suffer from cracks, even if the filter paper or art paper is used. As stated above, a combination of silica with the filter paper or art paper can provide the most appropriate formation of roughing function and of particle layer.

The thickness of the particle layer formed on the carrier is preferable to be 5μ–250μ. In case of less than 5μ, it is difficult to rough the surface of the cation-exchange membrane uniformly, and in case of more than 250μ, it is not preferable because of occurence of cracks in silica particle layer. So long as it is in this range, a satisfactory effect of surface treatment can be displayed irrespective depth of the roughing. The particle layer formed on the carried is required to be dried previously, for it, in state of containing water, generates vapor of water at the time of pressing and heating to cause sometimes destroy of the particle layer.

The silica powder particle layer formed on the filter paper or art paper is pressed with heating on the base material, cation-exchange membrane to form this particle layer on the surface of cation-exchange membrane. As the method of pressing, any of press or roll method can be used, which is preferably selected, depending on the mode of membrane of the base material, cation-exchange membrane. The condition of pressing is selected appropriately in consideration of the mode of cation-exchange group, which is preferable to be 100°–200° C. at the temperature and to be 5–100 kg/cm$^2$ at the pressure. The silica particle layer formed on the surface of cation-exchange membrane is dissolved and removed under the condition of temperature 20°–90° C. in a caustic soda aqueous solution of 1–30 weight% concentration. The roughed surface made on the surface of cation-exchange membrane through the above tratments is 0.1–20$\mu$ in average in depth from the surface of the membrane or in height and composed of minute unevenness of 10$^3$–10$^{15}$ in number, of which sectional shape is an irregular circle. These unevenness of the surface can be measured roughly by an instrument of measuring shape of surface (roughness-meter), but it is recommendable to adopt a method of measuring the depth or height and density from photographs of surface and section by the electronic microscope in order to identify accurately degree of the effect. The roughing of this invention can be applied not only to only one side of the membrane but also to both sides thereof. In case both sides are roughed, it is preferable to heat and press simultaneously the silica layers on both sides. In case only one side is roughed, the roughed surface is arranged so as to face the cathode side in state of the use. The surface-treated cation-exchange membrane obtained as above is used as a partition membrane separating anode chamber from cathode chamber. The cathode employed in this case is recommended to be resistant to the applied environment, to have a satisfactory catalytic action for the reaction, and to be of structure of not disturbing the out-flow of the resultant gas, which is preferably a conventionally employed cathode. For example, the porous matters such as metal net, expanded metal, lattice or longitudinal frame, panched metal, and the like of materials such as iron, soft steel, nickel, stainless steel and the like are exemplified without resulting any limitation.

Also, as the anode, the conventional anode that is resistant to the applied environment and has a satisfactory catalytic action for the reaction can be used, which is exemplified as a porous anode of covering the surface of graphite or valve metal such as titanium, tantalum, wolfram, zirconium, niobium and the like with platinum group metal such as platinum, paradium, ruthenium iridium and the like, oxide of the platinum group metal or a mixture of platinum group metal oxide and valve metal oxide. At the time of electrolysis, these electrodes can be used in state of contact with the surface of membrane can be used in state of contact with the surface of membrane or of being apart therefrom.

The second invention of the present inventions relates to a method of producing a cation-exchange membrane having roughed surface which is characterized in pressing with heating silica powder on surface of cation-exchange membrane, base material used for electrolysis of alkali chloride aqueous solution, thereafter dissolving out said silica powder with caustic alkali solution, and treating with boiling the obtained roughed surface of the cation-exchange membrane in 1–10 weight% aqueous solution of caustic soda, providing the cation-exchange membrane having roughed surface of not only preventing a marked elevation of voltage at the time of approaching the electrodes to the membrane but also lowering electrolysis voltage and further producing caustic alkali of high quality.

This second invention has been completed by finding out a method capable of lowering the voltage further more than that of the first invention in the process of study in the improvement thereof.

The cation-exchange membrane, of which surface is roughed by the method of the first invention, is further treated by the following process to give a surface-treated ion-exchange membrane of high properties which is also capable of lowering the absolute value of the voltage.

This process is that the cation-exchange membrane of roughed surface is subjected to boiling treatment in a dilute caustic alkali aqueous solution of 1–10 weight % concentration under the ordinary pressure. The period for the treatment is preferable to be 0.5–10 hours. When subjected to boiling treatment is water instead of dilute caustic soda solution, the cation-exchange membrane of roughed surface is so much swelled that the water content ratio becomes higher, particularly the current efficiency directly after commencement of electrolysis is more lowered, and thereby the anode is sometimes deteriorated, or the current efficiency is not readily recovered.

The concentration of dilute caustic alkali aqueous solution exceeding 10% can not find any treatment effect, which means no expectation for lowering effect of the voltage. Also, in case of lowering the treatment temperature to 80°–90° C. under the ordinary pressure, for example, the lowering effect of the voltage can not obtained, which is not preferable. Furthermore, it is preferable to take out the membrane of the boiling treatment, followed by drying it in air under a mild condition of temperature 10° to 50° C. Thus drying process gives high current efficiency from immediately after the commencement of electrolysis. Then, the third invention of the present inventions relate to a method of producing a cation-exchange membrane having roughed surface which is characterized in mixing silica powder with water to give a suspended or pasty mixture, supporting the resultant mixture on art paper as filter paper, drying the mixture to form silica powder layer, adhering with heating and pressing the silica powder layer on surface of membrane composed of perfluorocarbon polymer, removing the silica powder layer formed on the surface of said membrane with caustic alkali aqueous solution, and heating the cation-exchange membrane having thus obtained roughed surface in a mixed solution of caustic alkali aqueous solution and lower alcohol of $C_1$–$C_3$ at a temperature from 40° C. to the boiling point of the lower alcohol of $C_1$–$C_3$, providing an improved method capable of lowering the voltage required at the time of electrolysis further much more than in the first invention. In other words, this invention provides a cation-exchange membrane of not only preventing the voltage from marked elevation thereof at the time of approaching electrodes to membrane but also of lowering electrolysis voltage effectively and further of producing caustic alkali of high quality.

The cation-exchange membrane, of which surface is roughed by the method of the first invention, is further treated by the following process of third invention to give a surface-treated ion-exchange membrane of high quality which is also capable of lowering the absolute value of the voltage. Thus process consists of heating the surface-roughed cation-exchange membrane in a mixed solution of caustic alkali aqueous solution and lower alcohol of $C_1$-$C_3$ at a temperature of more than 40° C. and up to the boiling point of the lower alcohol of $C_1$-$C_3$.

Organic solvents other than those of this invention are not preferable by reason of no appearance of voltage lowering effect, of difficulties in handling, of price cost and so on. In case heated in only lower alcohol without caustic alkali aqueous solution, too, the swelling degree of cation-exchange membrane becomes high, the water containing ratio is also high and the drop of current efficiency is caused, which are not preferable. In short, only the treatment with the mixed solvent of this invention can lower said voltage. The concentrations of caustic alkali and lower alcohol in the mixed solution are determined by consideration on solubilities and treatment effects thereof, but the concentration of caustic alkali is preferably 5–20 weight% and lower alcohol is preferable to be 20–80 volume%.

In case of outside the above conditions, for example, when the concentration of caustic alkali becomes higher, the voltage lowering effect becomes lower and when the ratio of lower alcohol becomes higher, the cation-exchange membrane displays too much swelling, particularly causing the drop of current efficiency immediately after commencement of electrolysis and injuries of anode, which are not preferable.

In case the heating temperature is below 40° C., the voltage lowering effect does not appear, and in case heated at a temperature more than the boiling point of lower alcohol of $C_1$-$C_3$, it causes the drop of current efficiency, which is not preferable.

It is more preferable to take out and wash with water the cation-exchange membrane after performing the heat-treatment in the condition of this invention, followed by drying it in air under a mild condition of temperature 5°–50° C. when thus drying treatment is added, the membrane can display the properties which have been stable immediately since commencement of electrolysis. Furthermore, the voltage lowering effect can not be expected even if the membrane which is not subjected to surface-roughing treatment undergoes treatment with heating in the mixed solution of caustic alkali aqueous solution and lower alcohol of $C_1$-$C_3$. Hereinafter, the method of this invention is explained by concrete examples, and this invention does not undergo any restriction by these examples.

EXAMPLE 1

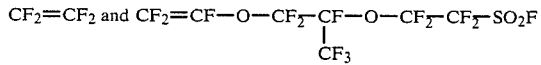

were polymerized in 1,1,2-trichloro-1,2,2-trifluoroethane with the use of perfluoropropionylperoxide as an initiator to give a polymer (the exchanging capacity as sulfonic acid group was 0.91 meq/g of dry resin), which was referred to as polymer A. Likewise as the above, a copolymer of $CF_2=CF_2$ and

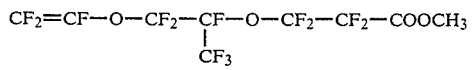

(the exchanging capacity was carboxylic acid group is 1.1 meq/g) was obtained, which was referred to as polymer B. Next, after forming polymer A in thickness of 100μ and polymer B in that of 75μ into a film respectively, these films were overlapped and hot-pressed to give a film which was the base material, cation-exchange membrane. After compounding silica fine powder of about 5μ in the average particle diameter thereof with water to prepare a pasty matter of 15 weight%, it was coated on an art paper to obtain a silica particle layer of about 50μ in thickness. The art papers supporting said silica particle layer were respectively put on both sides of the base material cation-exchange membrane and were subjected to heating and pressing under a condition of 160° C. and 60 kg/cm².

Thereafter, the cation-exchange membrane, where the silica powder pressed on the surface thereof was removed with 5 weight% aqueous solution of caustic soda under a condition of temperature 80° C., was hydrolysed at the same time to give a surface-roughed cation-exchange membrane.

Fabricating said cation-exchange membrane into a electrolysis cell so that polymer B side thereof might face to cathode thereof, employing an expanded metal of titanium covered with ruthenium oxide as anode and an expanded metal of iron as cathode respectively, fixing the distance between the anode and cathode to 1 mm, and setting the level for drawing out of caustic soda aqueous solution of the cathode chamber higher than the level of the anode chamber by 20 cm, the electrolysis was carried out in the state of contacting the membrane with said anode. Performing the electrolysis at a temperature of 90° C. and current efficiency of 40 A/dm² with supplying saturated sodium chloride solution into the anode chamber and water into the cathode chamber respectively and with maintaining the concentration of caustic soda in the cathode chamber to 33 weight%, the voltage was 3.33 V and the current efficiency was 96.5%.

The sodium chloride concentration in the product of 33 weight% caustic soda was low as 10 ppm.

COMPARATIVE EXAMPLE 1

Zinc powder of 7μ in the average particle diameter was suspended to be 2 weight%, particle layer of the zinc powder was formed by a filter method and it was heated and pressed on both sides of the base material cation-exchange membrane employed in example 1. Next, the zinc powder was removed by dissolving it into 10 weight% aqueous solution of caustic soda at 80° C., and the membrane was subjected to hydrolysis by treatment in 10 weight% aqueous solution of caustic soda at 90° C. for 24 hours. Under the same condition as in example 1 was carried out the electrolysis to get a result of the voltage 3.30 V and the current efficiency 94.0% at the current density of 40 A/dm².

COMPARATIVE EXAMPLE 2

Practicing the electrolysis in the quite same manner as in example 1, except not treating the both sides of the cation-exchange membrane at all, there obtained a result of the voltage 3.65 V and the current effeciency 96.0% at the current density of 40 A/dm².

EXAMPLE 2

Silica fine powder of 5μ in the average particle diameter was suspended in water to be 0.3 weight% and a silica particle layer of about 70μ in thickness was formed on a filter paper through the filter method. The filter paper supporting this silica particle layer thereon was, after being dried, put on the both side of the same base material cation-exchange membrane as in example 1 respectively to undergo heating and pressing under a condition of 160° C. and 20 kg/cm$^2$.

Thereafter, under the same treatment as in example 1 was practiced and the electrolysis was carried out under the same condition as in example 1 to get a result of the voltage 3.35 V and the current efficiency 96.5% at the current efficiency of 40 A/dm$^2$. The sodium chloride concentration in the product of 33 weight% caustic soda was low as 8 ppm.

EXAMPLE 3

The surface-roughed cation-exchange membrane obtained in example 1 was further subjected to boiling treatment in 2 weight% caustic soda aqueous solution for 3 hours, and thereafter it was washed and dried in air under a condition of 25° C. for 2 days. The obtained surface-roughed cation-exchange membrane was dipped overnight in 2 weight% caustic soda aqueous solution, and it was fabricated into an electrolysis cell in the same manner as in example and was subject to an electrolysis under the same condition as in example 1. As the result thereof, the voltage wax 3.25 V and the current efficiency was 96.5%.

COMPARATIVE EXAMPLE 3

Except practicing a boiling treatment in water for 3 hours instead of 2 weight% caustic soda aqueous solution, the surface-roughed cation-exchange membrane was treated by the same procedure as in example 3, and an electrolysis was carried out under the same condition as in example 3 to obtain a result of the voltage 3.24 V and the current efficiency 93.0% at the current density 40 A/dm$^2$.

COMPARATIVE EXAMPLE 4

Except practicing a boiling treatment in 20 weight% caustic soda aqueous solution for 3 hours instead of 2 weight% caustic soda aqueous solution, the surface-roughed cation-exchange membrane was treated by the same procedure as in example 3 and an electrolysis of the same condition as in example 3 was carried out to get a result of the voltage 3.34 V and the current efficiency 96.5% at the current density 40 A/dm$^2$.

EXAMPLE 4

The surface-roughed cation-exchange membrane, which was obtained in the same manner as in example 2 except employing the silica powder below 3$\mu$ instead of about 5$\mu$ in the average particle diameter thereof, was further treated with boiling in 5 weight% caustic soda aqueous solution for 3 hours and thereafter was dried in air under a condition of 25° C. for 2 days. After the obtained surface-roughed cation-exchange membrane was dipped overnight in 2 weight% caustic soda aqueous solution, an electrolysis of the same condition as in example 3 was carried out to get a result of the voltage 3.21 V and the current efficiency 96.0% at the current density of 40 A/dm$^2$.

EXAMPLE 5

One side of a cation-exchange membrane marketed from U.S. Du Pont Inc. under the trade name of "naphion 117" was chemically treated to produce a cation-exchange membrane of two layers structure SO$_3$H-/COOH having the carboxylic acid layer of about 40$\mu$ in thickness. Said membrane was surface-treated likewise as in example 4 and an electrolysis is carried out under the same condition as in example 4 to get the voltage 3.28 V and the current efficiency 97.0% at the current density of 40 A/dm$^2$.

EXAMPLE 6

Except practicing the drying process after the boiling treatment, the surface-roughed treatment was carried out in the same manner as in example 3, and an electrolysis was carried out under the same condition as in example 3. In the beginning thereof, both the voltage and the current efficiency were low and the recovery of the desired properties required about one week. The electrolysis properties through 7 days were the voltage 3.24 V and the current efficiency 96% and these properties were kept throughout the long period of 6 months.

EXAMPLE 7

The surface-roughed cation-exchange membrane obtained in example 1 was further treated with heating in a mixed solution of equivolume of 20 weight% caustic soda aqueous solution and methanol at 60° C. for 5 hours and thereafter dried in air under a condition of 25° C. for two days. The obtained surface-roughed cation-exchange membrane was dipped overnight in 2% caustic soda aqueous solution. Hereinafter, the electrolysis was performed in the quite same way as in example 1 to give a result of the voltage 3.25 V and the current efficiency 96.5%.

EXAMPLE 8

The cation-exchange membrane of two layers structure in example 5 was subjected to surface-roughing treatment in the quite same way in example 1 and employed in the electrolysis of the same condition as in example 1 to give the voltage 3.30 V and the current efficiency 96.5 at the current density of 40 A/dm$^2$.

EXAMPLE 9

Silica fine powder of below 3$\mu$ in the average particle diameter was suspended in water to be 0.3% by weight and a silica particle layer of about 70$\mu$ in thickness was formed on a filter paper through the filter method.

The filter paper supporting this silica particle layer thereon was put on the both sides of the same base material cation-exchange membrane as in example 7 respectively to undergo heating and pressing under a condition of 160° C. and 60 kg/cm$^2$. Thereafter, the silica particle adhered with pressing on the surface of the cation-exchange membrane was removed by dissolving it in 5 weight% aqueous solution of caustic soda under a condition the temperature was 80° C.

Next, thus cation-exchange membrane was treated with heating in an equiamount mixed solution of 20 weight% caustic soda aqueous solutin and ethanol at a temperature of 60° C. for five hours.

Employing the surface-roughed cation-exchange membrane obtained, the electrolysis was carried out in the same condition as in example 7. The initial values of voltage and current efficiency were as low as required about one week for recovering the desired properties, but thereafter stable properties were maintained. The electrolysis properties after seven days were as 3.23 V in voltage and 96.0% in current efficiency thereof.

What is claimed is:

1. A method of producing a cation-exchange membrane having a roughed surface and high strength said membrane being capable of reducing electrolysis voltage and maintaining current efficiency when used as a membrane in an electrolysis cell, said method comprising mixing silica powder having an average particle diameter of 0.01–20$\mu$, with water to give a suspended or pasty mixtures, supporting the resultant mixture on art paper or filter paper, drying the mixture to form silica powder layer, adhering with heating and pressing the silica powder layer on a surface of membrane composed of perfluorocarbon polymer having cation-exchange group and/or group convertible into the cation-exchange group, and removing the silica powder layer formed on the surface of said membrane with caustic alkali aqueous solution.

2. The method of producing a cation-exchange membrane having roughed surface recited in claim 1, wherein the thickness of the silica powder layer formed on the carrier is 5$\mu$ to 250$\mu$.

3. The method of producing a cation-exchange membrane having roughed surface recited in claim 1, wherein the silica powder layer was adhered with heating and pressing on the surface of the membrane under a condition of a temperature of 100°–200° C. and of a pressure of 5–100 kg/cm$^2$.

4. The method of producing a cation-exchange membrane having roughed surface recited in claim 1, wherein the silica powder layer formed on the surface of the membrane is removed by dissolution with caustic soda aqueous solution of a concentration of 1–30 weight% at a temperature of 20°–90° C.

5. A method of producing a cation-exchange membrane having a roughed surface and high strength said membrane being capable of reducing electrolysis voltage and maintaining current efficiency when used as a membrane in an electrolysis cell, said method comprising mixing silica powder having an average particle diameter of 0.01–20$\mu$, with water to give a suspended or pasty mixture, supporting the resultant mixture on art paper or filter paper, drying the mixture to form silica powder, adhering the silica powder with heating and pressing on surface of a cation-exchange membrane having cation-exchange group and/or group convertible into the cation-exchange group, thereafter dissolving out thus silica powder formed on the surface of membrane with caustic alkali aqueous solution and treating the obtained roughed surface of the cation-exchange membrane with boiling aqueous solution of 1–10 weight% caustic soda.

6. The method of producing a cation-exchange membrane having roughed surface recited in claim 5, wherein, after the boiling treatment of the roughed surface, it is further subjected to washing and drying.

7. A method of producing a cation-exchange membrane having a roughed surface and high strength said membrane being capable of reducing electrolysis voltage and maintaining current efficiency when used as a membrane in an electrolysis cell, said method comprising mixing silica powder having an average particle diameter of 0.01–20$\mu$, with water to give a suspended or pasty mixture, supporting the resultant mixture on art paper or filter paper, drying the mixture to form silica powder, adhering the silica powder layer with heating and pressing on surface of membrane composed of perfluorocarbon polymer having cation-exchange group and/or group convertible into the cation-exchange group, removing with dissolving the silica powder layer formed on the surface of said membrane with caustic alkali aqueous solution, and heating the cation-exchange membrane having thus obtained roughed surface in a mixed solution of caustic alkali aqueous solution and lower alcohole of $C_1$–$C_3$ at a temperature from 40° C. to the boiling point of the lower alcohol of $C_1$–$C_3$.

8. The method of producing a cation-exchange membrane having roughed surface recited in claim 7, wherein, after heating in the mixed solution of caustic alkali aqueous solution and lower alcohol of $C_1$–$C_3$, washing and drying are applied thereto.

9. A cation-exchange membrane having a roughed surface and high strength said membrane being capable of reducing electrolysis voltage and maintaining current efficiency when used as a membrane in an electrolysis cell, which is obtainable by a process comprising the step of mixing silica powder having an average particle diameter of 0.01–20$\mu$, with water to give a suspended or pasty mixture, step of supporting the resultant mixture on art paper or filter paper, step of drying the mixture to form silica powder layer, step of adhering with heating and pressing said silca powder layer on surface of membrane composed of perfluorocarbon polymer having cation-exchange group and/or group convertible into the cation-exchange group, and step of removing the silica powder layer formed on the surface of said membrane with caustic alkali aqueous solution.

10. A cation-exchange membrane having a roughed surface and high strength said membrane being capable of reducing electrolysis voltage and maintaining current efficiency when used as a membrane in an electrolysis cell, which is obtainable by a process comprising the step of mixing silica powder having an average particle diameter of 0.01–20$\mu$, with water to give a suspended or pasty mixture, step of supporting the resultant mixture on art paper or filter paper, step of drying the mixture to form silica powder, step of adhering the silica powder with heating and pressing on surface of a cation-exchange membrane having cation-exchange group and/or group convertible into the cation-exchange group, step of thereafter dissolving out thus silica powder formed on the surface of membrane with caustic alkali aqueous solution and step of treating the obtained roughed surface of the cation-exchange membrane with boiling aqueous solution of 1–10 weight% caustic soda.

11. The cation-exchange membrane having roughed surface recited in claim 10, wherein step of washing and drying is followed after the step of the boiling treatment of the roughed surface.

12. A cation-exchange membrane having a roughed surface and high strength said membrane being capable of reducing electrolysis voltage and maintaining current efficiency when used as a membrane in an electrolysis cell, which is obtainable by a process comprising the step of mixing silica powder having an average particle diameter of 0.01–20$\mu$, with water to give a suspended or pasty mixture, step of supporting the resultant mixture on art paper or filter paper, step of drying the mixture to form silica powder layer, step of adhering with heating and pressing on surface of membrane composed of perfluorocarbon polymer having cation-exchange group and/or group convertible into the cation-exchange group, step of removing with dissolving the silica powder layer formed on the surface of said membrane with caustic alkali aqueous solution, and step of heating the cation-exchange membrane having thus obtained roughed surface in a mixed solution of caustic alkali aqueous solution and lower alcohol of $C_1$–$C_3$ at a temperature from 40° C. to the boiling point of the lower alcohol of $C_1$–$C_3$.

13. The cation-exchange membrane having roughed surface recited in claim 12, wherein step of washing and drying is applied after the step of heating in the mixed solution of caustic alkali aqueous solution and lower alcohol of $C_1$–$C_3$.

* * * * *